United States Patent [19]

Masson et al.

[11] 4,101,684

[45] Jul. 18, 1978

[54] EXTRUSION PROCESS FOR THE TREATMENT OF CEREALS

[75] Inventors: John Richard Masson, Brigstock; Joseph Dooley, Bugbrook, both of England

[73] Assignee: Golden Wonder Limited, England

[21] Appl. No.: 762,438

[22] Filed: Jan. 24, 1977

[51] Int. Cl.$^2$ ............................................. A23L 1/164
[52] U.S. Cl. .................................. 426/625; 426/449; 426/450; 426/516
[58] Field of Search ............... 426/625, 449, 448, 446, 426/621, 447, 516, 450, 618

[56] References Cited

U.S. PATENT DOCUMENTS

| | | | |
|---|---|---|---|
| 2,269,536 | 1/1942 | Kellogg, Jr. | 426/621 |
| 2,489,267 | 11/1949 | Chapin et al. | 426/625 |
| 3,580,728 | 5/1971 | Gulstad et al. | 426/449 |
| 3,656,965 | 4/1972 | Strommer et al. | 426/449 |
| 3,708,308 | 1/1973 | Bedenk et al. | 426/449 |

*Primary Examiner*—Jeanette M. Hunter
*Attorney, Agent, or Firm*—Larson, Taylor and Hinds

[57] ABSTRACT

This invention relates to an extrusion process for the treatment of edible maize. The process comprises the addition of extruded maize which has been milled to dust to raw maize grit which is to be extruded in a cooker/extruder. The addition of the maize dust allows a greater control over the density of the extrudate. Potato powder may be added to the mixture.

8 Claims, No Drawings

EXTRUSION PROCESS FOR THE TREATMENT OF CEREALS

This invention relates to an extrusion process for the treatment of cereal, i.e. edible grain, to provide an expanded cooked product in the preparation of a snack food.

A known cooker extruder for maize grit has an inlet for the cereal which leads into an extrusion chamber comprising a sleeve within which a conveyor screw is arranged to rotate. The outlet end of the extrusion chamber comprises a die housing which provides a restricted outlet. Maize grit fed to the extrusion chamber is subjected to high pressure and the friction generated between the screw and sleeve maintains a temperature of about 150° C which gelatinises the maize. As the latter is extruded through the orifices in the die plate it expands due to the drop in pressure. A rotating knife cuts the extrudate into specified lengths.

Due to the friction fit of the screw in the sleeve, wear takes place in the sleeve. The density of the extrudate is dependent on several factors, notably the condition of the sleeve but also the rate of feed to the chamber, the rotational speed of the screw, the temperature in the chamber, the orifice area and the moisture content of the cereal. With a new sleeve the maize extrudate normally has a high density and a hard texture and often contains small particles of unexpanded maize. As the sleeve becomes worn the density of the extrudate decreases, finally becoming unacceptable in the finished product, in other words the density of the product is uncontrollably affected by wear of the extruder sleeve. When the density is high, the weight of raw cereal required is correspondingly high and this is reflected in the raw material costs.

For economic production, the lowest acceptable density is required so as to provide a minimum contents over weight for the bags or other containers in which the extruded product is to be marketed. If however the feed rate or the screw speed is reduced to provide a low density product the volumetric output of the extruder will be correspondingly reduced. Alternatively, if the die plate is changed to vary the die orifices or if a different sleeve is fitted to vary the screw fit the extruder has to be temporarily shut down, thus interrupting production.

One object of the present invention is to provide an extrusion process for a cereal grit, e.g. maize grit, wherein a controlled variation in density of the cooked extrudate is achieved without adversely affecting the volumetric output from the extruder.

According to the invention, an extrusion process for a cereal which comprises subjecting a cereal to heat and pressure in an extrusion chamber of a cooker extruder is characterized in that an additive comprising particles of cereal which have been expanded and milled is mixed with the cereal before extrusion to control the density of the extrudate.

The temperature in the extrusion chamber is controlled by cooling units to lie within the range 115°–165° C.

The density-controlling additive is preferably cereal which has already been expanded in a cooker extruder and has then been reduced to a suitable particle size.

The expanded cereal may be milled in a known rotary sieve wherein the expanded cereal is fed into a mesh cylinder where a rotating paddle scrapes it against the mesh. The resulting particle size which can be varied by changing the cylinder is not uniform but does not exceed 1400 microns.

The proportion by weight of additive to raw cereal is at a maximum when the extruder sleeve is new and is then progressively decreased to zero as sleeve wear takes place. The maximum proportion of additive is 15% because above this figure mixing problems arise, viz. the raw cereal settles out from the lighter cereal additive.

EXAMPLE 1

In this Example the machines used comprise a cooker extruder and a rotary sieve, each of the kind described above, and a ribbon blade mixer. The mixer is used to mix water with the raw cereal and then additive with the moist raw cereal.

The raw cereal is a maize grit and the additive cereal is a maize grit which has been expanded in a previous extrusion process and then milled to a particle size not greater than 1400 microns. The additive cereal may comprise waste material from a previous extrusion process. A sampling container of known weight and capacity for periodically taking a sample of the extrudate is also provided.

The extruder is preheated to approximately 150° (but not above 165° C) then started up and the extrusion chamber is fed with raw cereal only. The extrudate is collected and a sample taken with the sampling container. If the extrudate is found to have an unacceptably high density, an estimated suitable quantity of the cereal additive is mixed with the raw cereal in the ribbon blade mixer. Since the cereal additive is drier than raw cereal, a compensating quantity of water is added to the raw cereal in the mixer before the cereal additive is introduced. The resultant mixture having a moisture content of about 13–15% by weight is then fed to the extrusion chamber. The extrudate will now show a decrease in density when a sample is taken with the sampling container. If the density decrease is too great, the addition of cereal additive is reduced until an acceptable extrudate is obtained. The original high-density extrudate made from the raw cereal only and also any unacceptably low-density extrudate are collected and then milled in the sieve to provide future cereal additive. During production of the expanded cereal the extrusion chamber sleeve becomes progressively worn and as this wear takes place so the density of the extrudate decreases. This density decrease is detected using the sampling container and the amount of cereal additive to keep the extrudate within acceptable predetermined density limits is immediately reduced. When the extruder sleeve is almost worn out, the extrudate density has decreased so much that no further cereal additive is necessary. The density of the extrudate continues to decrease until the extrudate density becomes unacceptable. The extruder is now stopped operating and the worn sleeve is replaced. Cereal additive is then added to the raw cereal in the mixer. When a new sleeve is fitted the extrudate density is at its highest. In order to reduce this density a maximum amount of 15% by weight of additive is necessary to reduce the density to an acceptable level.

The cut lengths of extrudate are baked to crispness, flavoured and put into bags or other marketing containers.

EXAMPLE 2

The machines used are the same as for Example 1. The procedure followed is also the same as for Example 1 except that in the mixer ordinary potato powder is mixed in with the moistened raw maize grit. The percentage by weight of the potato powder is 10%. The density-controlling additive remains the same, viz. maize grit which has been expanded by a previous extrusion process and then milled to a particle size not exceeding 1400 microns. Likewise, the maximum proportion of cereal additive should not exceed 15% by weight of the maize/potato mixture.

With reference to the Table below which relates to the same extruder typical extrudates containing only maize (Example 1) are Products A whilst typical extrudates containing maize and potato (Example 2) are Products B.

TABLE

| Product | Extrusion Mixture | Density in gms/liter | Machine Consumption in lbs/hour | Output of Extrudate in cu ft/hour |
|---|---|---|---|---|
| | Standard (i.e. without cereal additive) | 47 | 180 | 60.0 |
| A | Containing 5% by weight cereal additive | 44 | 180 | 65.4 |
| A | Containing 7% by weight cereal additive | 37 | 154 | 66.5 |
| | Standard (i.e. without cereal additive) | 65 | 210 | 53.3 |
| B | Containing 3% by weight cereal additive | 62 | 210 | 54.2 |
| B | Containing 6% by weight cereal additive | 55 | 195 | 56.2 |
| B | Containing 9% by weight cereal additive | 51 | 180 | 56.4 |
| B | Containing 12% by weight cereal additive | 47 | 180 | 61.2 |

It has been found that each product has an acceptable density range. The objective of the process is to keep the density of the mixture or extrudate as low as possible within an acceptable range for the product concerned. The Table shows that for Products A and B the amount of mixture required will decrease with increasing cereal additive and reduced density whereas the continuous volumetric output of the extruder actually increases. It follows that there is a more efficient utilisation of raw material, and a reduced weight contents per bag or other marketing container which in turn permits a reduced usage of flavour per container contents.

What we claim is:

1. An extrusion process for a raw cereal comprising the steps of:
   (a) subjecting a raw cereal to heat and pressure in an extrusion chamber of a cooker extruder having a sleeve and a co-operating screw, which sleeve during operation is subject to wear which affects the density of the extrudate;
   (b) adding to the raw cereal upstream of the cooker extruder an additive comprising particles of cereal which have already been expanded and milled;
   (c) monitoring the density of the extrudate;
   (d) utilizing the results of the monitoring to determine the amount of said additive to be added to the raw cereal upstream of extrusion so as to keep the density of the subsequent extrudate within a predetermined range; and
   (e) adding the determined amount of said additive to the raw cereal to keep the density of the extrudate within said range.

2. A process according to claim 1, wherein the proportion by weight of the cereal additive to the raw cereal is at a maximum to start with and is then decreased with wear of the sleeve in the extrusion chamber to keep the density of the extrudate within a predetermined range.

3. A process according to claim 1, wherein the particles of the cereal additive are the milled product of a former extrusion process.

4. A process according to claim 1, wherein the cereal is maize grit and the cereal additive is maize grit which has been expanded by an extrusion process and milled.

5. A process according to claim 1, wherein water ia added to the cereal before the addition of the cereal additive so as to compensate for a drying effect produced by the subsequent addition of the cereal additive.

6. A process according to claim 2, wherein said proportion of cereal additive does not exceed 15% by weight of the raw cereal.

7. A process according to claim 6, wherein the temperature in the extrusion chamber does not exceed 165° C.

8. A process according to claim 1, wherein potato powder is added to the cereal before extrusion.

* * * * *